United States Patent
Penney

(10) Patent No.: US 12,011,089 B2
(45) Date of Patent: Jun. 18, 2024

(54) GARAGE DOOR MOUNTABLE STORAGE ASSEMBLY

(71) Applicant: Todd Penney, Fort St John (CA)

(72) Inventor: Todd Penney, Fort St John (CA)

( * ) Notice: Subject to any disclaimer, the term of this patent is extended or adjusted under 35 U.S.C. 154(b) by 430 days.

(21) Appl. No.: 17/344,628

(22) Filed: Jun. 10, 2021

(65) Prior Publication Data

US 2022/0395098 A1 Dec. 15, 2022

(51) Int. Cl.
*A47B 96/07* (2006.01)
*A47B 81/00* (2006.01)
*E06B 7/28* (2006.01)
*F16M 13/02* (2006.01)

(52) U.S. Cl.
CPC ............ *A47B 96/07* (2013.01); *A47B 81/005* (2013.01); *E06B 7/28* (2013.01); *F16M 13/02* (2013.01)

(58) Field of Classification Search
CPC ......... E06B 7/28; A47B 81/005; A47B 96/07; A47B 95/00; F16M 13/02
See application file for complete search history.

(56) References Cited

U.S. PATENT DOCUMENTS

| | | | |
|---|---|---|---|
| 4,333,624 A * | 6/1982 | Raddatz | F16M 13/02 248/205.1 |
| D345,273 S | 3/1994 | Horn | |
| 6,029,830 A * | 2/2000 | Manookian | A63B 71/0045 248/339 |
| 6,276,539 B1 | 8/2001 | Richbourg | |
| 6,821,600 B1 * | 11/2004 | Henson | B32B 3/06 383/14 |
| 6,969,068 B1 * | 11/2005 | Pollon | A63B 63/00 273/400 |
| 7,958,925 B2 | 6/2011 | Murray | |
| 9,668,574 B2 | 6/2017 | Wagner | |
| 10,258,852 B1 * | 4/2019 | Walker | A63B 69/00 |
| 10,334,973 B2 * | 7/2019 | Slevin-Giesler | A47B 43/006 |
| 10,667,609 B2 | 6/2020 | Haines | |
| 2006/0038468 A1 | 2/2006 | Morgan | |
| 2012/0234505 A1 | 9/2012 | Hartwig | |
| 2014/0165472 A1 * | 6/2014 | McLemore | A47B 43/006 248/205.2 |
| 2016/0201844 A1 * | 7/2016 | Potter | A47F 5/01 29/428 |

FOREIGN PATENT DOCUMENTS

CA 2950918 6/2018

* cited by examiner

*Primary Examiner* — Beth A Stephan

(57) ABSTRACT

A garage door mountable storage assembly for increasing storage capacity of a garage includes a first connector, a first coupler, and a retaining unit. The first connector and the first coupler are mountable to a panel of a garage door so that an imaginary line extending therebetween is substantially perpendicular to upper and lower limits of the panel. The retaining unit has engaged thereto a second connector and a second coupler, which are complementary to the first connector and the first coupler, respectively. The second connector and the second coupler are positioned to selectively engage the first connector and the first coupler to removably engage the retaining unit to the panel of the garage door. The retaining unit can be positioned around an article, with the retaining unit extending between the first connector and the first coupler, to removably secure the article to the panel of the garage door.

8 Claims, 6 Drawing Sheets

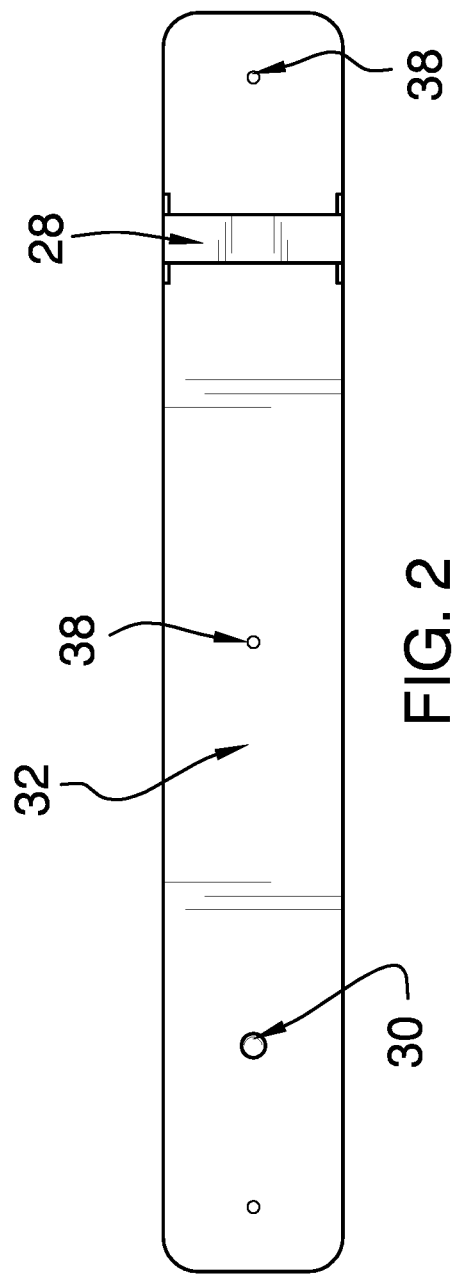
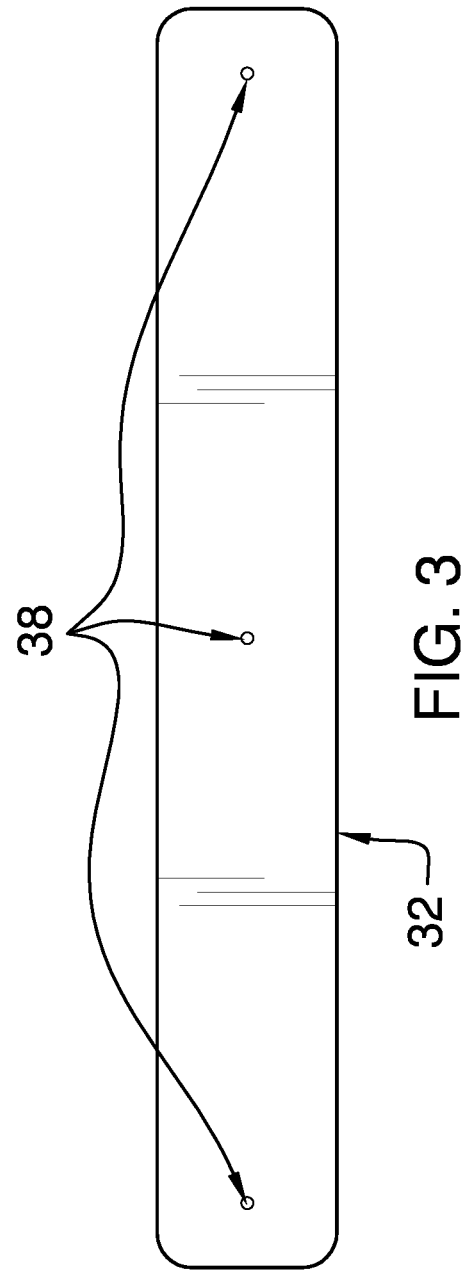
FIG. 2
FIG. 3

GARAGE DOOR MOUNTABLE STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage assemblies and more particularly pertains to a new storage assembly for increasing storage capacity of a garage. The present invention discloses a storage assembly comprising a first connector and a first coupler, which are configured to be mountable to a panel of a garage door, and which are positioned to selectively engage a second connector and a second coupler positioned on a retaining unit.

(2) Description of Related Art Including Information Disclosed Under 37 CFR 1.97 and 1.98

The prior art relates to storage assemblies. Prior art storage assemblies may comprise brackets engageable to garage doors and being configured to engage storage bins or long guns, brackets having holes therein for insertion of rods, and netting pockets or cabinets engageable to garage doors. What is lacking in the prior art is a storage assembly comprising first connector and a first coupler, which are configured to be mountable to a panel of a garage door, and which are positioned to selectively engage a second connector and a second coupler positioned on a retaining unit.

BRIEF SUMMARY OF THE INVENTION

An embodiment of the disclosure meets the needs presented above by generally comprising a first connector, a first coupler, and a retaining unit. The first connector and the first coupler are configured to be mountable to a panel of a garage door so that an imaginary line extending therebetween is substantially perpendicular to upper and lower limits of the panel. The retaining unit has engaged thereto a second connector and a second coupler, which are complementary to the first connector and the first coupler, respectively. The second connector and the second coupler are positioned to selectively engage the first connector and the first coupler to removably engage the retaining unit to the panel of the garage door. The retaining unit is configured to be positioned around an article, with the retaining unit extending between the first connector and the first coupler, to removably secure the article to the panel of the garage door.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a rear view of an embodiment of the disclosure.

DETAILED DESCRIPTION OF THE INVENTION

Figure 1:
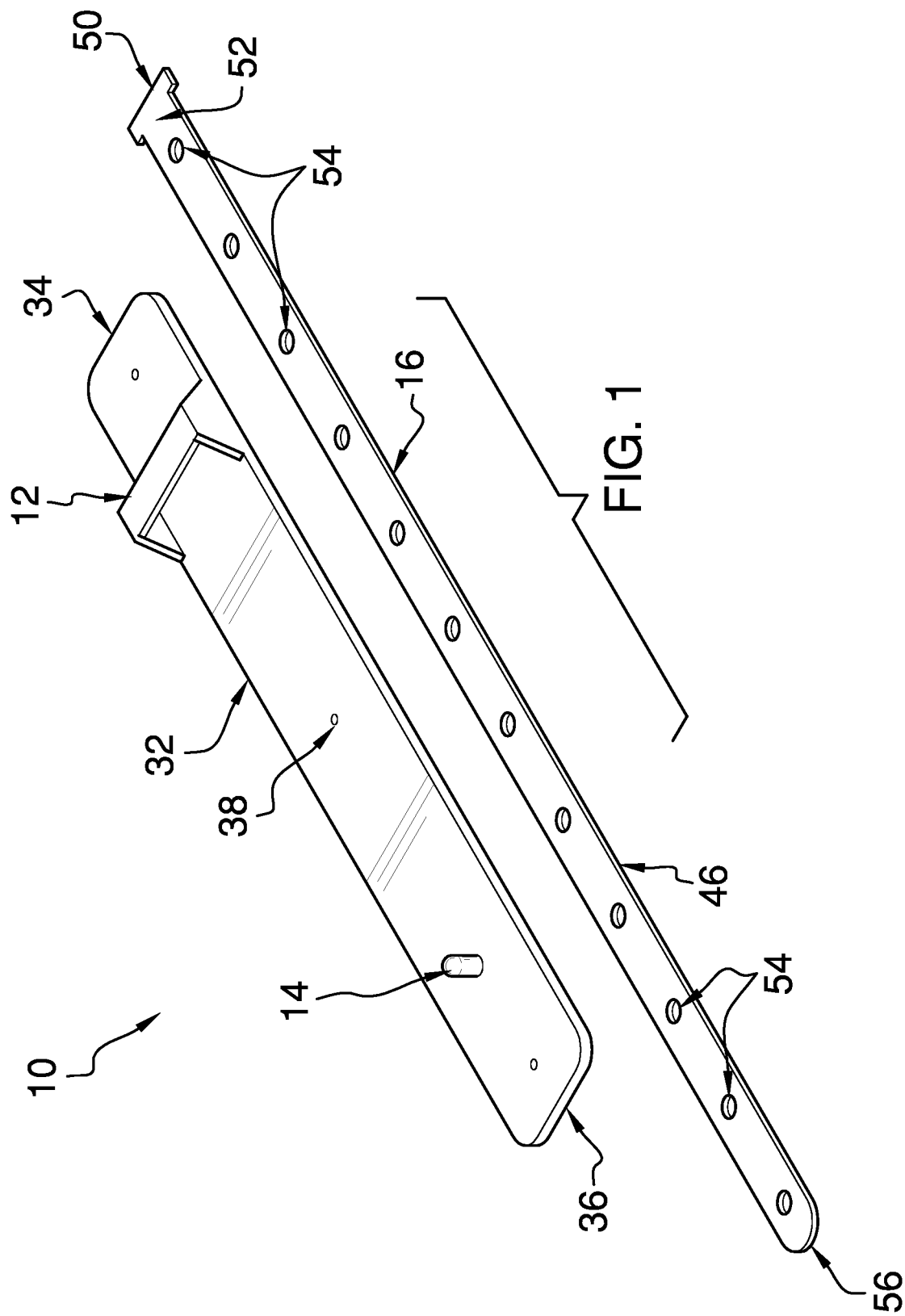
FIG. 1 is an isometric perspective view of a garage door mountable storage assembly according to an embodiment of the disclosure.

With reference now to the drawings, and in particular to FIGS. 1 through 7 thereof, a new storage assembly embodying the principles and concepts of an embodiment of the disclosure and generally designated by the reference numeral 10 will be described.

As best illustrated in FIGS. 1 through 7, the garage door mountable storage assembly 10 generally comprises a first connector 12, a first coupler 14, and a retaining unit 16. The first connector 12 and the first coupler 14 are configured to be mountable to a panel 18 of a garage door 20 so that an imaginary line 22 extending therebetween is substantially perpendicular to upper 24 and lower 26 limits of the panel 18. The first connector 12 may comprise a ring 28 and the first coupler 14 may comprise a peg 30. The present invention anticipates the first connector 12 comprising other connecting means, such as, but not limited to, hooks, snap closures, eyebolts, and the like. The present invention also anticipates the first coupler 14 comprising other coupling means, such as, but not limited to, hooks, snap closures, eyebolts, and the like.

Figure 4:
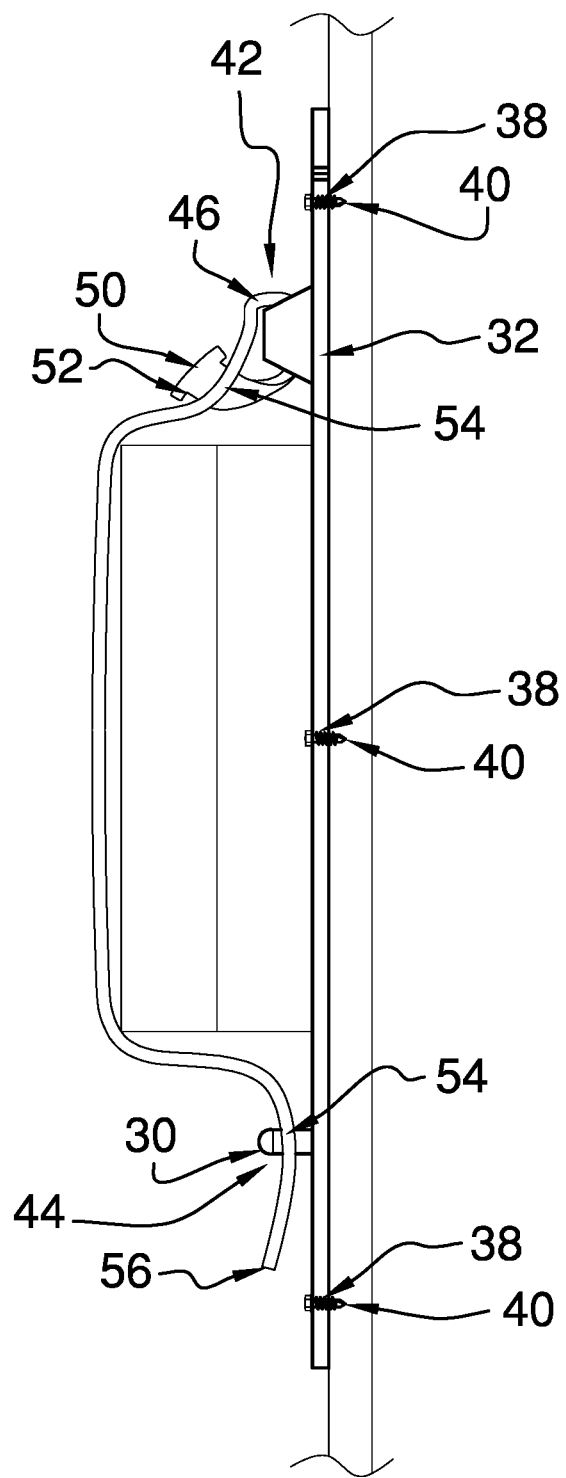
FIG. 4 is a side in-use view of an embodiment of the disclosure.
Figure 5:
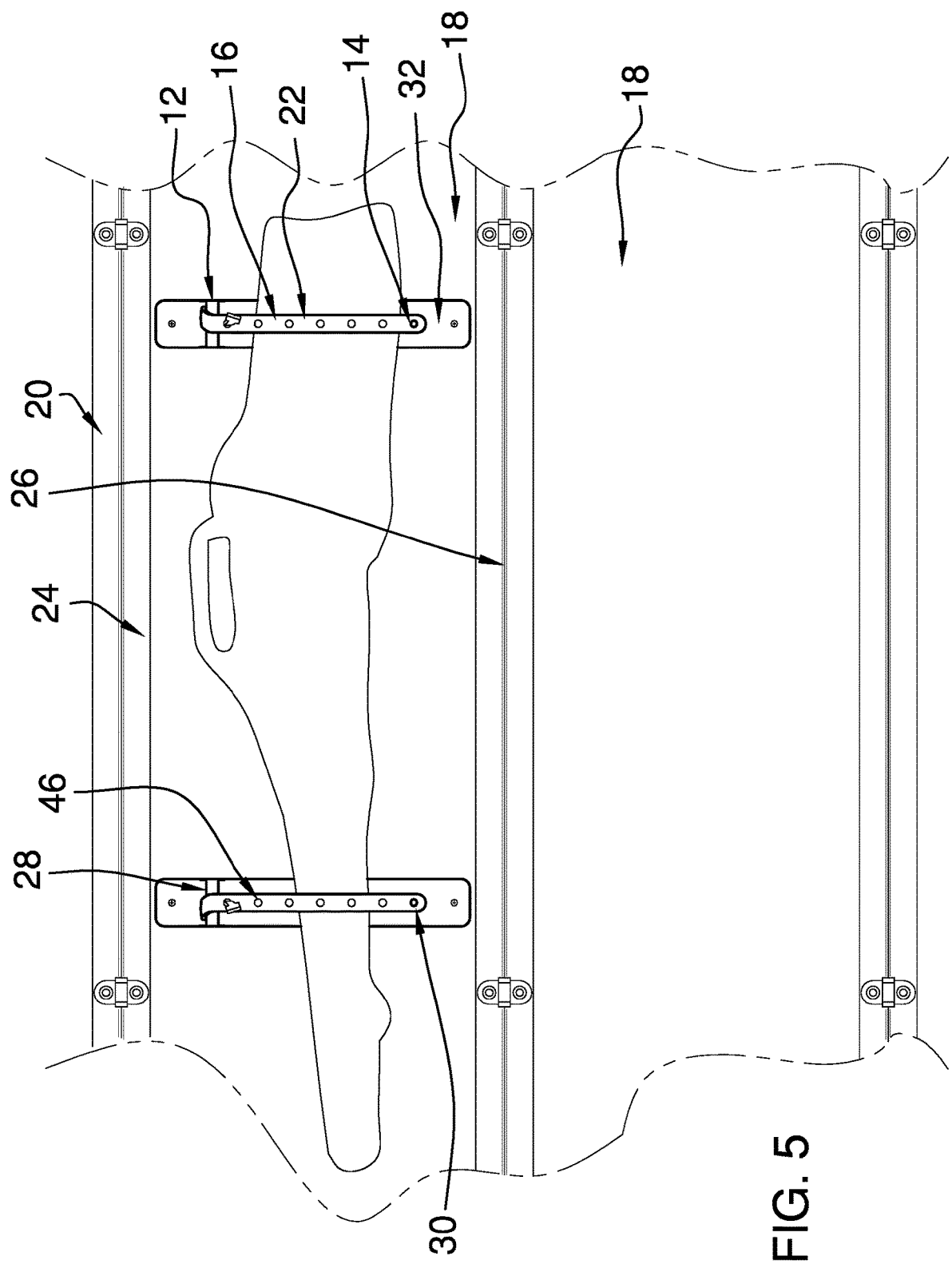
FIG. 5 is a front in-use view of an embodiment of the disclosure.

The present invention also may include a plate 32, which has engaged thereto and extending therefrom the ring 28 and the peg 30, as shown in FIG. 1. The ring 28 and the peg 30 are positioned proximate to an upper end 34 and a lower end 36 of the plate 32, respectively. The peg 30 is arcuate distal from the plate 32. The plate 32 has positioned therein a set of holes 38, with each hole 38 being configured for insertion thereinto of a respective piece of mounting hardware, such as a screw 40 as shown in FIG. 4, to mount the plate 32 to the panel 18 of the garage door 20. The set of holes 38 may comprise two or three holes 38, as shown in FIGS. 7 and 3, respectively.

The retaining unit 16 has engaged thereto a second connector 42 and a second coupler 44, which are complementary to the first connector 12 and the first coupler 14, respectively. The second connector 42 and the second coupler 44 are positioned to selectively engage the first connector 12 and the first coupler 14 to removably engage the retaining unit 16 to the panel 18 of the garage door 20. The retaining unit 16 is configured to be positioned around an article, with the retaining unit 16 extending between the first connector 12 and the first coupler 14, to removably secure the article to the panel 18 of the garage door 20.

Figure 6:
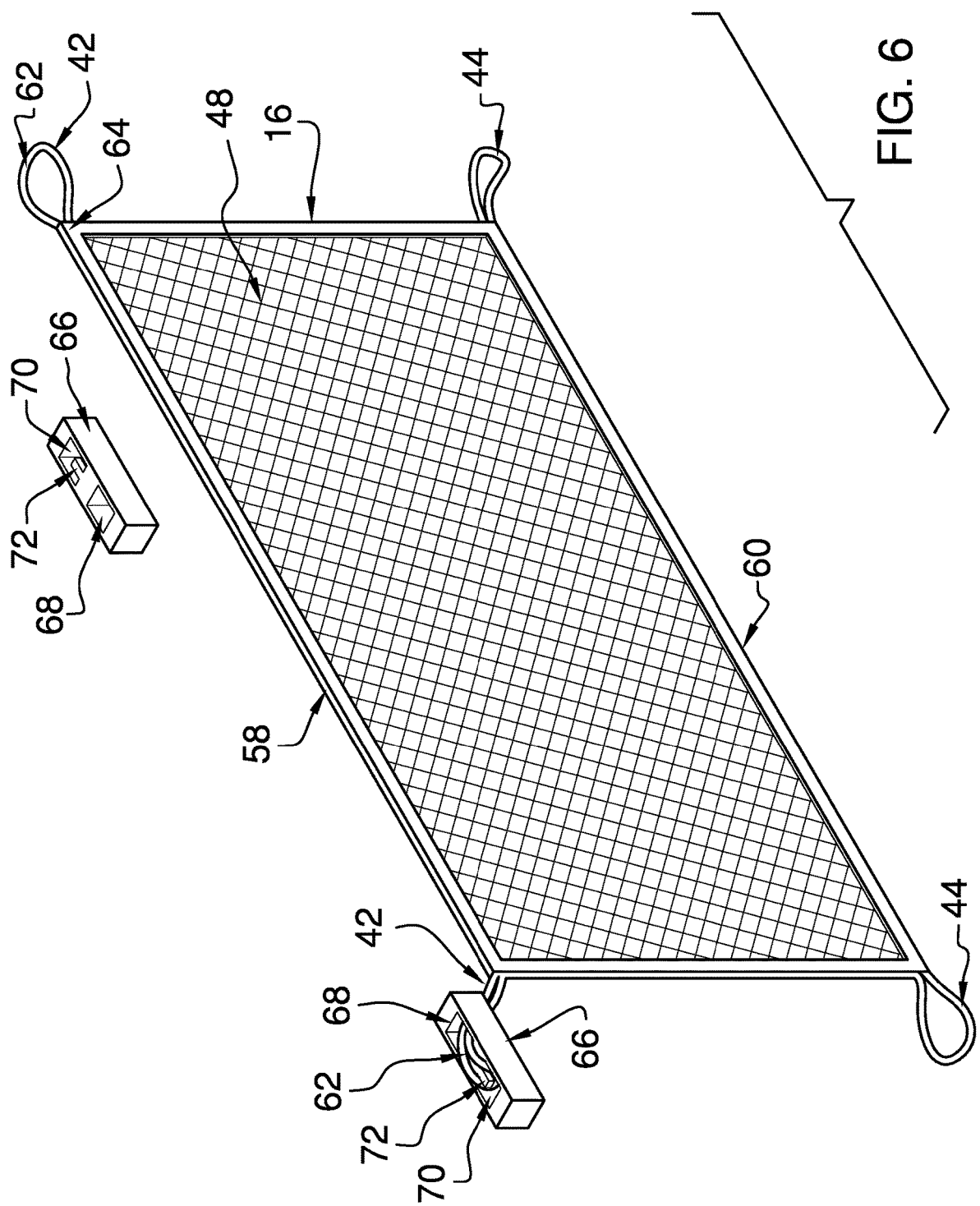
FIG. 6 is an isometric perspective view of an embodiment of the disclosure.
Figure 7:
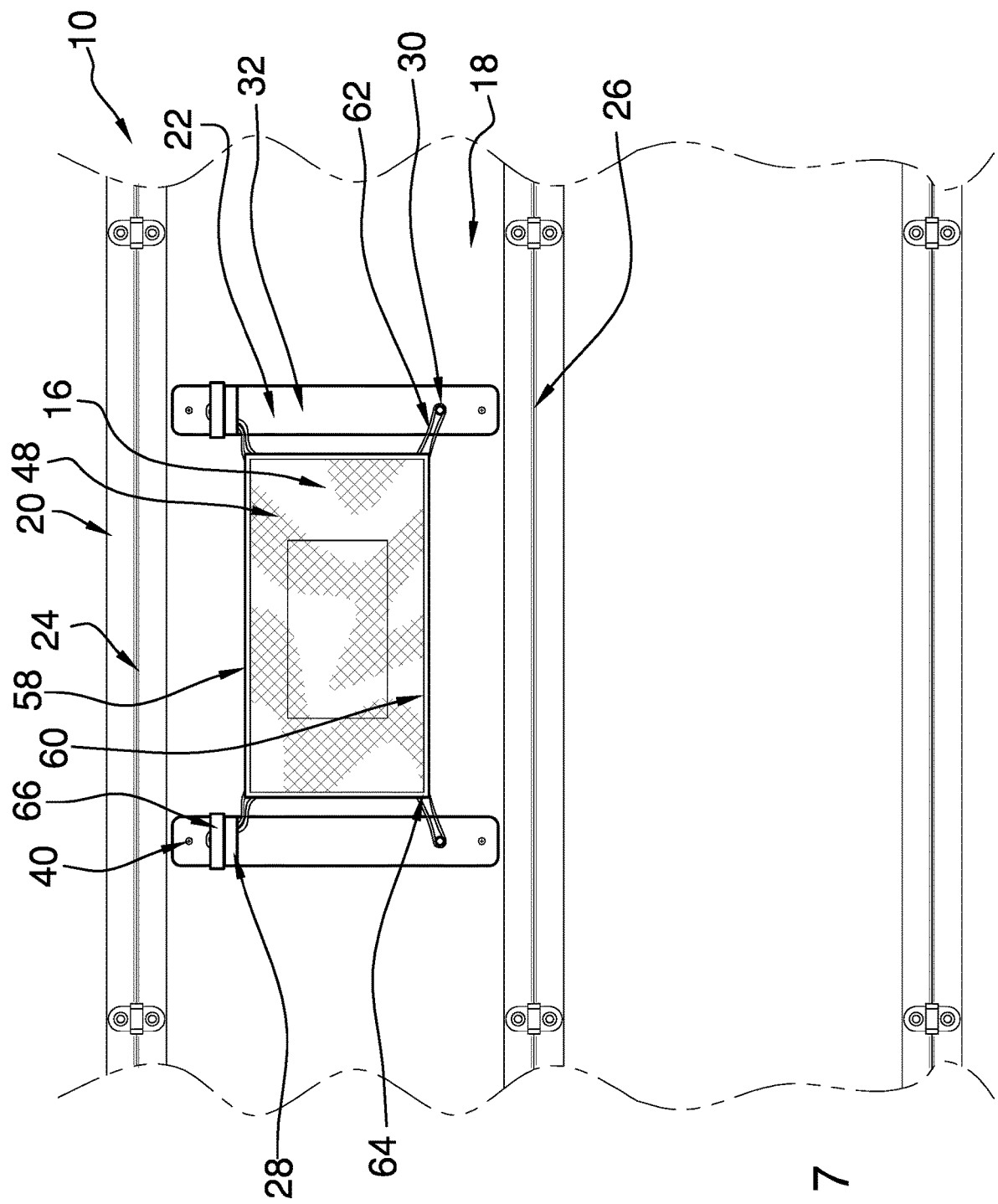
FIG. 7 is a front in-use view of an embodiment of the disclosure.

The retaining unit 16 may comprise a strap 46, as shown in FIGS. 1-5, or a net 48, as shown in FIGS. 6 and 7. The strap 46 has a tab 50 engaged thereto and extending bidirectionally from a first end 52 thereof. The strap 46 has a plurality of apertures 54 positioned therein and extending from proximate to the first end 52 to proximate to a second end 56 thereof. Each aperture 54 is complementary to the peg 30. The strap 46 is positioned to be looped through the ring 28, positioning the second end 56 for insertion into a respective aperture 54 positioned in the strap 46 proximate to the first end 52 to removably engage the strap 46 to the ring 28, as shown in FIG. 4. The strap 46 is configured to be positioned around the article, positioning a respective aperture 54 for insertion of the peg 30 to removably secure the article to the garage door 20.

As shown in FIG. 4, multiple retaining units 16 can be utilized to secure longer articles to the garage door 20. The strap 46 may comprise rubber, silicone, or elastomer, so that it is resiliently stretchable. The strap 46 being resiliently stretchable facilitates its placement around the article and helps to retain the article securely against the panel 18 as the garage door 20 is raised and lowered.

With the retaining unit 16 comprising the net 48, as shown in FIGS. 6 and 7, the first connector 12 is one of a set of first connectors 12 and the first coupler 14 is one of a set of first couplers 14. The second connector 42 comprises a set of second connectors 42 engaged to a first edge 58 of the net 48. The second coupler 44 comprises a set of second couplers 44 engaged to a second edge 60 of the net 48. The net 48 is configured to be positioned over the article so that the second connectors 42 and the second couplers 44 are positioned to engage the first connectors 12 and the first couplers 14, respectively, to secure the net 48 around the article. The article thus is removably secured to the panel 18 of the garage door 20 by the net 48. The net 48 is resiliently stretchable and thus is stretchable around the article. The net 48 comprises elastomer, rubber, silicone, or the like.

With each first connector 12 comprising a ring 28 and each first coupler 14 comprising a peg 30, each of the second couplers 44 and each of the second connectors 42 comprises a loop 62, which is engaged to and extends from a respective corner 64 of the net 48.

Each of a set of blocks 66 has a first channel 68 and a second channel 70 extending therethrough. Each of a set of protrusions 72 is engaged to a respective block 66 and extends into an associated second channel 70. A respective ring 28 and the first channel 68 of the respective block 66 are positioned for sequential insertion of a respective loop 62 positioned on the first edge 58 of the net 48. The respective loop 62 is positioned to engage the protrusion 72 to engage the respective loop 62 to the respective block 66, as shown in FIG. 6. The respective block 66 is larger than the respective ring 28 so that the respective block 66 is prevented from passing therethrough. Each of the loops 62 positioned on the second edge 60 of the net 48 is positioned to engage an associated peg 30 to secure the net 48 around the article, as shown in FIG. 7.

In use, the plate 32 is attached to the panel 18 of the garage door 20 using the screws 40. The strap 46 is positioned through the ring 28 and then its second end 56 is inserted through a respective aperture 54 positioned in the strap 46 proximate to the first end 52 to attach the strap 46 to the ring 28. The article then can be positioned against the plate 32 and the strap 46 stretched over the article. The peg 30 is inserted into a respective aperture 54 to fix the strap 46 in place and to secure the article to the panel 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A garage door mountable storage assembly comprising:
   a first connector and a first, coupler configured to be mountable to a panel of a garage door, such that an imaginary line extending between the first connector and the first coupler is substantially perpendicular to upper and lower limits of the panel; and
   a retaining unit having engaged thereto a second connector and a second coupler, the second connector and the second coupler being complementary to the first connector and the first coupler, respectively, such that the second connector and the second coupler are positioned for selectively engaging the first connector and the first coupler for removably engaging the retaining unit to the panel of the garage door, wherein the retaining unit is configured to be positioned around an article, with the retaining unit extending between the first connector and the first coupler, for removably securing the article to the panel of the garage door;
wherein the first connector comprises a ring and the first coupler comprises a peg; and
a plate having engaged thereto and extending therefrom the ring and the peg, the ring and the peg being positioned proximate to an upper end and a lower end of the plate, respectively, the plate having positioned therein a set of holes, wherein each of the holes is configured for insertion thereinto of a respective piece of mounting hardware for mounting the plate to the panel of the garage door.

2. The garage door mountable storage assembly of claim 1, wherein the peg is arcuate distal from the plate.

3. The garage door mountable storage assembly of claim 1, wherein the set of holes comprises two or three holes.

4. The garage door mountable storage assembly of claim 1, further comprising the retaining unit being a net, wherein the net is resiliently stretchable, such that the net is stretchable around the article.

5. The garage door mountable storage assembly of claim 4, wherein the net comprises elastomer.

6. A garage door mountable storage assembly comprising:
a first connector and a first coupler configured to be mountable to a panel of a garage door, such that an imaginary line extending between the first connector and the first coupler is substantially perpendicular to upper and lower limits of the panel;
a retaining unit having engaged thereto a second connector and a second coupler, the second connector and the second coupler being complementary to the first connector and the first coupler, respectively, such that the second connector and the second coupler are positioned for selectively the first connector and the first coupler for removably engaging the retaining unit to the panel of the garage door, wherein the retaining unit is configured to be positioned around an article, with the retaining unit extending between the first connector and the first coupler, for removably securing the article to the panel of the garage door;
wherein the first connector comprises a ring and the first coupler comprises a peg; and
wherein the retaining unit comprises a strap, the strap including the second connector being a tab engaged thereto and extending bidirectionally from a first end thereof, the strap including the second coupler being a plurality of apertures positioned therein and extending from proximate to the first end to proximate to a second end thereof, each of the apertures being complementary to the peg, such that the strap is positioned for looping through the ring, positioning the second end for insertion into a respective one of the apertures for removably engaging the strap to the ring, wherein the strap is configured for positioning around the article, a respective one of the apertures is configured to be positioned for insertion of the peg for removably securing the article to the garage door.

7. The garage door mountable storage assembly of claim 6, wherein the strap comprises rubber, silicone, or elastomer.

8. A garage door mountable storage assembly comprising:
a first connector and a first coupler configured to be mountable to a panel of a garage door, such that an imaginary line extending between the first connector and the first coupler is substantially perpendicular to upper and lower limits of the panel, the first connector comprising a ring, the first coupler comprising a peg;
a plate having engaged thereto and extending therefrom the ring and the peg, the ring and the peg being positioned proximate to an upper end and a lower end of the plate, respectively, the peg being arcuate distal from the plate, the plate having positioned therein a set of holes, wherein each of the holes is configured for insertion thereinto of a respective piece of mounting hardware for mounting the plate to the panel of the garage door, the set of holes comprising two or three holes;
a retaining unit having engaged thereto a second connector and a second coupler, the second connector and the second coupler being complementary to the first connector and the first coupler, respectively, such that the second connector and the second coupler are positioned for selectively engaging the first connector and the first coupler for removably engaging the retaining unit to the panel of the garage door, wherein the retaining unit is configured to be positioned around an article, with the retaining unit extending between the first connector and the first coupler, for removably securing the article to the panel of the garage door, the retaining unit comprising a strap, the strap including the second connector being a tab engaged thereto and extending bidirectionally from a first end thereof, the strap including the second coupler being a plurality of apertures positioned therein and extending from proximate to the first end to proximate to a second end thereof, each of apertures being complementary to the peg, such that the strap is positioned for looping through the ring, positioning the second end for insertion into a respective aperture for removably engaging the strap to the ring, wherein the strap is configured for positioning around the article, positioning a respective aperture for insertion of the peg for removably securing the article to the garage door, the strap comprising rubber, silicone, or elastomer;
the first connector being one of a set of first connectors, the first coupler being one of a set of first couplers;
the retaining unit comprising a net, the net being resiliently stretchable, such that the net is stretchable around the article, the net comprising elastomer;
the second connector comprising a set of second connectors engaged to a first edge of the net;
the second coupler comprising a set of second couplers engaged to a second edge of the net, wherein the net is configured for positioning over the article, such that the second connectors and the second couplers are positioned for engaging the first connectors and the first couplers, respectively, for securing the net around the article, such that the article is removably secured to the panel of the garage door, each of the second couplers and each of the second connectors comprising a loop engaged to and extending from a respective corner of the net;
a set of blocks, each of the blocks having a first channel and a second channel extending therethrough; and
a set of protrusions, each of the protrusions being engaged to one of the blocks and extending into an associated second channel, such that the ring of the plate and the first channel of the respective block are positioned for sequential insertion of the loop extending from on the the net, such that the respective loop is positioned for engaging the protrusion for engaging the respective loop to the respective block, the respective block being larger than the respective ring, such that the respective block is prevented from passing therethrough, such that each of the loops extending from the net is positioned or engaging one of the pegs for securing the net around the article.

\* \* \* \* \*